United States Patent [19]
Hara et al.

[11] Patent Number: 5,724,591
[45] Date of Patent: Mar. 3, 1998

[54] MULTIPROCESSOR SYSTEM WITH REDUCED POWER MODE AND IMPROVED VARIATION OF POWER DEMAND

[75] Inventors: Tsutomu Hara, Fujisawa; Takashi Maruyama, Ebina; Hitoshi Yoshidome, Kawasaki; Ryuichi Hattori; Tsunehiro Tobita, both of Yokohama, all of Japan

[73] Assignee: Hitachi, Ltd., Tokyo, Japan

[21] Appl. No.: 592,236

[22] Filed: Jan. 26, 1996

[30] Foreign Application Priority Data

Jan. 27, 1995 [JP] Japan .................. 7-011821

[51] Int. Cl.$^6$ ............... G06F 1/32; G06F 1/26
[52] U.S. Cl. ............... 395/750; 364/707; 364/492
[58] Field of Search ............... 395/750, 800, 395/182.12; 364/707, 492

[56] References Cited

U.S. PATENT DOCUMENTS

| | | | |
|---|---|---|---|
| 4,677,566 | 6/1987 | Whittaker et al. | 364/492 |
| 4,851,987 | 7/1989 | Day | 395/750 |
| 4,958,273 | 9/1990 | Anderson et al. | 395/800 |
| 5,070,450 | 12/1991 | Holman, Jr. | 395/750 |
| 5,167,024 | 11/1992 | Smith et al. | 395/375 |
| 5,210,871 | 5/1993 | Lala et al. | 395/296 |
| 5,253,359 | 10/1993 | Spix et al. | 395/183.22 |
| 5,428,553 | 6/1995 | Chiba et al. | 364/492 |
| 5,553,236 | 9/1996 | Revilla et al. | 395/183.01 |

FOREIGN PATENT DOCUMENTS

| | | |
|---|---|---|
| 2-162457 | 6/1990 | Japan . |
| 2-176921 | 7/1990 | Japan . |

OTHER PUBLICATIONS

"Standards for reduction of power demand effects the design of computer"; Nikkei Electronics, No. 590, Sep. 13, 1993 pp. 103–134.

*Primary Examiner*—Gopal C. Ray
*Attorney, Agent, or Firm*—Antonelli, Terry, Stout, & Kraus, LLP

[57] ABSTRACT

A multiprocessor system is provided with processor units which are grouped beforehand into some groups, a system status monitoring unit for monitoring a key input operation of a keyboard, a power demand monitoring unit for calculating the difference between the total power demand of the processor units at the present time and the total power demand of the processor units in a low power-demand mode which is measured beforehand, when the key input operation is not carried out in a normal operation mode for a predetermined time, and an operation clock controller for successively reducing or stopping operation clocks supplied to the respective processor units for each group in turn to shift the current mode to the low power-demand mode. With this construction, a power variation which occurs at the time of the switching operation between the normal operation mode and the low power-demand mode or at the time of power supply/power shut-off can be reduced.

20 Claims, 7 Drawing Sheets

MULTIPROCESSOR SYSTEM WITH REDUCED POWER MODE AND IMPROVED VARIATION OF POWER DEMAND

BACKGROUND OF THE INVENTION

1. Field of the Invention

The present invention relates to a multiprocessor system having plural processors.

2. Description of Related Art

An information processing device such as a note-book (portable) type personal computer, a word processor or the like is generally equipped with a battery therein. Various batteries have been practically used for this purpose, and each of these batteries has a limited charging capacity (i.e., has a limitation to its charge amount). Therefore, it has been an important matter to reduce power demand for a device as much as possible when the battery is actuated.

In addition, as described in "NIKKEI ELECTRONICS MAGAZINE" (No.590, pp103-123) issued on Sep. 13, 1993, in view of an energy saving requirement, it has also been required to reduce the power demand under a non-use (standby) condition for a general information processing device which uses a commercial power source in a U.S. Energy Star Computers Program or the like encouraged by the EPA (Environmental Protection Agency).

Accordingly, at present various power saving activities are performed by shifting an operation mode of an information processing device from a normal operation mode to a low power-demand mode or other modes. The shift to the low power-demand mode is performed, for example, by reducing the frequency of an operation clock of a CPU or stopping the supply of the operation clock, or by changing a supply source voltage to the CPU from 5V to 3.3V. One of such conventional techniques is disclosed in Japanese Laid-open Patent Application (KOKAI) No. Hei 2-176921, for example.

According to the conventional techniques, the power demand of a device can be reduced, but, a large variation in power occurs when the operation mode is shifted from the normal mode to the low power-demand mode (or from the low power-demand mode to the normal mode). There is no problem when only a CPU is used and its power demand is small. On the other hand, in a multiprocessor system which is equipped with plural CPUs to increase an operation speed and a device performance, the total power demand is relatively large, and thus the following problem occurs.

Now, representing a variation of demand for power per CPU by Q watt(w) and assuming that the above power-demand variation occurs simultaneously in N CPUs, the total variation of power demand is equal to a large value of N·Q watts (W). When the power quantity of N·Q watts (W) varies simultaneously as described above, a rush current in a power source circuit becomes extremely large. The rush current causes noise in a power source portion and a ground portion for supplying a reference potential on a circuit board, and induces malfunctions of the device. This noise is radiated to the air, so that it may act as noise to impair the function of other devices such as televisions, radios or communication devices, or may induce malfunctions in other information processing devices. Problems due to the rush current also occur when the power is shut off or supplied. In order to prevent the rush current, a protection circuit may be newly provided, for example, by inserting a capacitor having large capacitance in the power source circuit, or the like. In this case, however, the power source portion must be designed in a large size, or the power source efficiency may be lowered.

SUMMARY OF THE INVENTION

An object of the present invention is to provide a multiprocessor which is capable of reducing a variation of power demand occurring when one of a normal operation mode and a low power-demand mode is switched to the other, or when the power is shut off or supplied.

In order to attain the above object, according to a first aspect of the present invention, a multiprocessor having plural processor units includes a reception circuit for receiving a setting demand of one of a first mode in which each of the plural processor units is under a normal state and a second mode in which each of the plural processor units is in a low power-demand state where consumed power is smaller than that of the normal state, and a setting circuit for previously classifying the plural processor units into plural groups each containing at least one processor unit to successively set the plural processor units to the normal state for each group in turn when the reception circuit receives the setting demand of the first mode, and to successively set the plural processor units to the low power-demand state for each group in turn when the reception circuit receives the setting demand of the second mode.

According to a second aspect of the present invention, the setting circuit of the multiprocessor system of the first aspect measures the total power demand of the plural processor units when the reception circuit receives the setting demand of the first mode or the second mode, calculates the difference between the measured total power demand and a total power demand of the plural processor units in the demanded mode which is stored in advance, and collectively sets the plural processor units to the normal state or the low power-demand state in accordance with the demanded mode when the calculated difference is smaller than a predetermined value.

According to a third aspect of the present invention, in the multiprocessor system of the first or second aspect, the setting circuit changes the operation frequency of the processor units to perform a switching operation of the processor units between the normal state and the low power-demand state.

According to a fourth aspect of the present invention, in the multiprocessor system of the first or second aspect, the setting circuit changes a voltage to be supplied to the processor units to perform the switching operation of the processor units between the normal state and the low power-demand state.

According to a fifth aspect of the present invention, the multiprocessor system of the first, second, third or fourth aspect of the present invention, is further provided with an input circuit for monitoring an external operation, and a circuit for outputting the setting demand of the second mode to the reception circuit when a state in which the external operation is not monitored by the input circuit in the first mode is continued for a predetermined time, and outputting the setting demand of the first mode to the reception circuit when a state in which the external operation is monitored by the input circuit in the second mode.

According to a sixth aspect of the present invention, the multiprocessor system of the first, second, third or fourth aspect of the present invention, is further provided with a detection circuit for detecting the magnitude of the total load of processing of the plural processor units, respectively, and a circuit for outputting the setting demand of the second mode to the reception circuit when the first mode is set and when the magnitude of the total load detected by the detection circuit is smaller than the magnitude of a predetermined total load and this state is continued for a predetermined time, and outputting the setting demand of the first mode to the reception circuit when the second mode is set and when the magnitude of the total load detected by the detection circuit is larger than the magnitude of the predetermined total load.

According to a seventh aspect of the present invention, a multiprocessor having plural processor units includes a circuit for previously classifying the plural processor units into plural groups each containing at least one processor unit, and successively supplying power to the plural processor units on a group by group basis when receiving an external power supply demand and successively stopping the power supply to the plural processor units when receiving an external power stop demand.

According to an eighth aspect of the present invention, in the multiprocessor system of the first, second, third, fourth, fifth, sixth or seventh aspect of the present invention, the plural processor units are grouped on every mounted print wiring board.

According to the multiprocessor system of the present invention, the reception circuit can receive the setting demand of any one of the first mode in which the plural processor units are in the normal state and the second mode in which the plural processor units are in the low power-demand state. The setting circuit previously classifies the plural processor units into plural groups each containing at least one processor unit. The setting circuit successively sets the plural processor units to the normal state on a group by group basis when the reception circuit receives the setting demand of the first mode, and successively sets the plural processor units to the low power-demand state on a group by group basis when the reception circuit receives the setting demand of the second mode. The power variation at the time of the mode shift can be suppressed by switching the state of each processor unit on a group basis.

When the difference between the total power demand of the respective processor units in a current mode and the total power demand of the respective processor units after the mode is shifted to the other mode is smaller than a predetermined value, the plural processor units can be collectively set to the normal state or the low power-demand state. The state switching operation of the respective processor units can be performed by changing the operation frequency of the processor units or the supply voltage thereto.

Furthermore, the multiprocessor system may be designed so that the setting demand to be received by the reception circuit is output in accordance with an operation reception status of the input circuit or the total load of the processing of the plural processors, respectively.

When the external power supply demand is received, the power is supplied to the plural processor units, each group in turn. On the other hand, when the external power stop demand is received, the power supply to the plural processor units is stopped for each group in turn. With this operation, the power variation occurring at the power-supply time or power-supply shut-off time can be suppressed.

If the plural processor units are grouped for each print wiring board to be mounted, the state switching operation of the processor units can be performed for each print wiring board in turn, so that a control operation can be simplified.

As described above, according to the present invention, the plural processor units are classified into some groups, and the power demand of each group is varied in turn, so that the power variation can be suppressed. The suppression of the power variation reduces spike noise occurring in a power source or a ground portion, thereby preventing malfunction of other circuits or radiation noise due to the spike noise.

DETAILED DESCRIPTION OF PREFERRED EMBODIMENTS

Preferred embodiments in which a multiprocessor system of the present invention is applied to a personal computer will be described with reference to the accompanying drawings.

Figure 1:
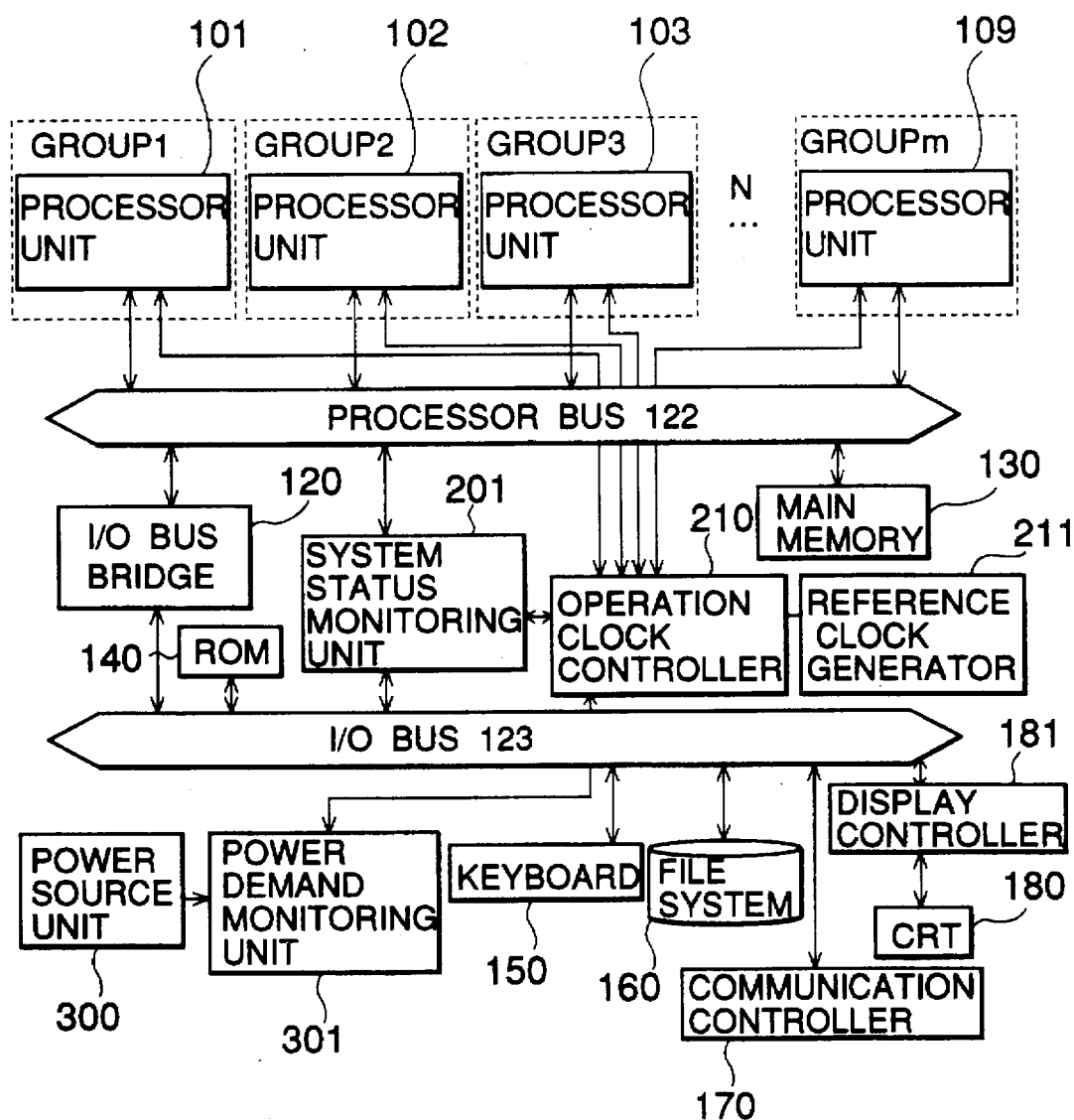
FIG. 1 is a block diagram showing a first embodiment of a multiprocessor system according to the present invention.
Figure 2:
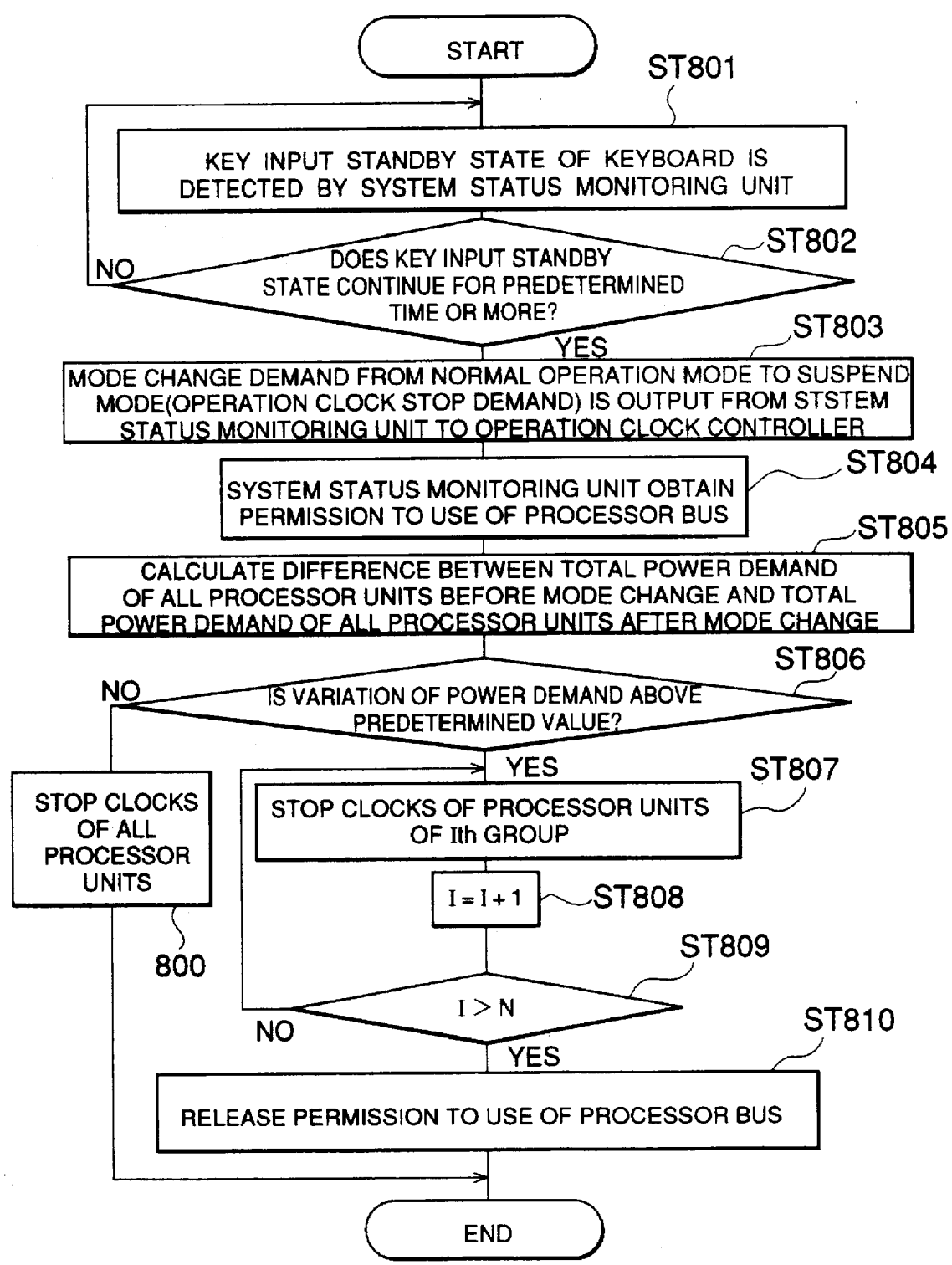
FIG. 2 is a flowchart for a shift of processing to a suspend mode in the first embodiment of the present invention.
Figure 3:
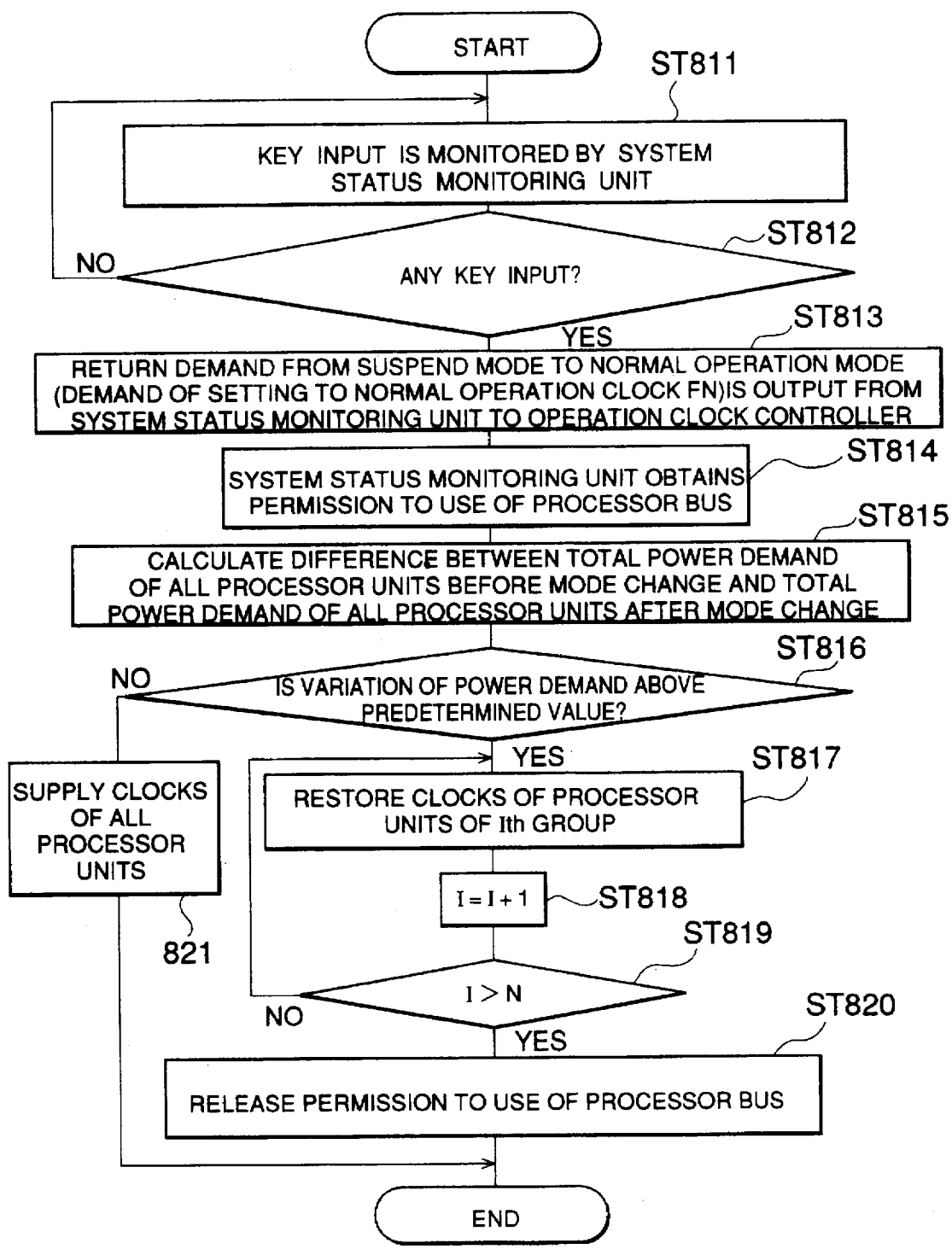
FIG. 3 is a flowchart for a return of processing from the suspend mode in the first embodiment of the present invention.

A first embodiment of the multiprocessor system of the present invention is shown in FIGS. 1 to 3.

In FIG. 1, N processor units (101, 102, 103, . . . , 109) are classified into m groups, and each of these processor units is connected to a processor bus 122. In this embodiment, a processor unit is allocated to a group, and a one-to-one correspondence relationship (N=m) is satisfied between the groups and the processor units. Each processor unit contains a CPU having the same specification.

The processor bus 122 is connected through an I/O bus bridge 120 to an I/O bus 123. A main memory 130 is connected to the processor bus 122, and it is accessed by each processor unit. A keyboard 150, a file system 160, a communication control unit 170, a display control unit 181 and a ROM 140 are connected to the I/O bus 123. The display control unit 181 controls an image display operation of a CRT 180.

Further, the multiprocessor system of this embodiment includes a system status monitoring unit 201, an operation clock controller 210, a power demand monitoring unit 301, a power source unit 300 and a reference clock generator 211.

The system status monitoring unit 201 comprises a circuit for detecting that the keyboard 150 is kept on standby for key input, a timer for counting a key input standby time or a counter for counting the frequency of loops under the key input standby state, and a calculation circuit for judging whether the counted time or the counted frequency of loops is equal to or larger than a predetermined value, and outputting a clock control instruction to the operation clock controller. In place of these circuits, a processor may be used.

The operation clock controller 210 comprises a frequency dividing circuit for changing the frequency of the operation clocks to be supplied to the plural processor units, and a clock stop circuit or PLL for performing an "AND" (logical product) operation between a clock stop/start signal and the operation clocks.

The power demand monitoring unit 301 comprises a wattmeter for measuring the total power demand of all the processor units (or an ammeter for measuring the total current demand of all the processor units or a voltmeter for measuring a voltage occurring across an existing minute resistor which is inserted in a power supply line to measure the total current demand of all processor units), a memory unit for storing both of the total power demand of all the processor units when the operation clocks of all the processor units are stopped and a predetermined power variation, a calculation circuit for subtracting, from the total power demand of all the processor units, the total power demand of all the processor units when the operation clocks of all the processor units are stopped, a calculation circuit for judging whether the subtraction result (value) is larger than the predetermined power variation, and a circuit for outputting to the clock control unit a clock stop instruction corresponding to a calculation result. In place of these circuits, a processor may be used.

The operation clock controller 210 generates a clock signal to be supplied to each processor unit on the basis of a clock signal supplied from the reference clock generator 211. In each processor unit, the operation frequency of the CPU varies in accordance with the supplied clock signal. Specifically, when the operation clocks supplied from the operation clock controller 210 are reduced or stopped, the power which is consumed by each CPU is reduced to a smaller value than that at the normal operation time.

Most of the power which is consumed by this system is consumed by all the processor units, but the power to be consumed by each processor unit is not so large. Accordingly, even when the power demand of any one of the processor units varies from zero to a normal power demand, hardly any malfunction occurs in the system because noise is small, and also an effect of the radiation noise is negligible.

Next, an operation when the system of this embodiment is set to a suspend mode will be described with reference to FIGS. 1 and 2.

In the suspend mode, each processor unit is set to a low power-demand state. The suspend mode is achieved by reducing or stopping the operation clock to be supplied to each processor unit. In order to simplify the description, the following description will be given for a case where the operation clocks are stopped. In the following description, it is assumed that each processor unit is supplied with a clock signal having a normal clock frequency (fn). In this state, the system status monitoring unit 201 monitors a key input of the keyboard 150 through the I/O bus 123.

When the system status monitoring unit 201 detects that the keyboard 150 is kept on standby for the key input (step 801), it is judged whether this standby state is continued for a predetermined time or more (step 802). If the key input standby state is continued for the predetermined time or more, the system state monitoring unit 201 requests the operation clock controller 210 to stop the clock output to each processor unit, and also outputs a measuring instruction to the power demand monitoring unit 301. The clock stop processing of the operation clock controller 210 is actually performed after a stop instruction from the power demand monitoring unit 301 is received (step 803). After outputting the measuring instruction, the system status monitoring unit 201 can preferentially use the processor bus 122 (step 804).

When receiving the measuring instruction, the power demand monitoring unit 301 measures the total power demand of all the processor units. Subsequently, in the power demand monitoring unit 301, the total power demand of all the processor units when the operation clock of each processor unit is stopped (hereinafter referred to as "estimated power demand A") is subtracted from the measured power demand (hereinafter referred to as "power demand A") to calculate a variation power (hereinafter referred to as "variation power A"). The estimated power demand A is a value which is measured in advance, and it is stored beforehand in a ROM 140 (step 805).

Subsequently, the power demand monitoring unit 301 judges whether the calculated variation power A is larger than a predetermined variation power (hereinafter referred to as "estimated variation power A") (step 806). The estimated variation power A is set to a value which has no effect on the system, and it is stored beforehand in the ROM 140 like the estimated power demand A. If the variation power A is larger than the estimated variation power A, the power demand monitoring unit 301 outputs a first stop instruction to the operation clock controller 210. In response to the first stop instruction, the operation clock controller 210 successively stops the operation clocks which are supplied to the respective processor unit (step 807, step 808, step 809).

As described above, the power variation when the mode is shifted to the suspend mode can be reduced by successively stopping the operation clocks to be supplied to the N processor units. When plural processor units are allocated to each group, the clock stop operation is collectively performed on the processor units in each group, and this operation is performed on all the groups in turn.

On the other hand, in step 806, if the calculated variation power A is smaller than the predetermined estimated variation power A, the power demand monitoring unit 301 outputs a second stop instruction to the operation clock controller 210. In response to the second stop instruction, the operation clock controller 210 simultaneously stops the clocks of all the processor units over all the groups (step 800). If the calculated variation power A has such a magnitude that it has no effect on the system, the simultaneously stopping operation of the clocks for all the processor units as described above is the best way to shorten a processing time.

Subsequently, permission to use the processor bus 122 is released when the operation clocks of all the processor units have been stopped (step 810).

The foregoing description is made on the processing flow when the mode is shifted to the suspend mode. As described above, if the system status monitoring unit 201 obtains permission to use the processor bus 122 (S804) before the clock stop processing (S807), data communication between processor units,.between a processor unit and an external cache, and between a processor unit and a memory, etc. can be prohibited. This operation can keep coherence between data which is held in a register or internal cache built into a processor unit and data which is held in an external cache or memory.

The relationship between a transient current i and an induced voltage V is generally expressed by the following equation:

$$V = -L \times (di/dt) \qquad [L: \text{inductance}]$$

That is, the induced voltage V is proportional to the variation power, specifically, the variation of the current. Therefore, when the plural processor units are classified into m groups and the operation clocks of the processor units are successively stopped for each group in turn, the variation of the current can be suppressed by the above successive stopping operation, so that the induction voltage V can be reduced. If the induction voltage V is reduced, spike noise occurring in a power source or a ground portion can be suppressed, so that malfunctions of the system and the occurrence of radiation noise can be prevented.

Some CPUs can perform power saving by varying only the internal operation frequency in accordance with a status while externally receiving operation clocks having a fixed frequency, and it is needless to say that the present invention can be achieved by using these CPUs.

Next, an operation when the mode is returned from the suspend mode to the normal operation mode will be described with reference to FIGS. 1 and 3.

The system status monitoring unit 201 continues to monitor the keyboard 150 through the I/O bus 123 during the setting period of the suspend mode (step 811) to detect the key input (step 812), and if the key input is performed, the processing of the step 813 is carried out.

In step 813, the system status monitoring unit 201 requests the operation clock controller 210 to start the supply of the operation clocks (clock frequency fn), and also supplies the measuring instruction to the power demand monitoring unit 301. The clock supply start processing of the operation clock controller 210 is actually performed after it receives a start instruction from the power demand monitoring unit 301 (step 813). After outputting the measuring instruction, the system status monitoring unit 201 obtains permission to use of the processor bus 122 (that is, it can use the processor bus 122) (step 814).

In response to the measuring instruction, the power demand monitoring unit 301 measures the total power demand of all the processor units. Subsequently, in the power demand monitoring unit 301, the measured power demand (hereinafter referred to as "power demand B") is subtracted from the total power demand of all the processor units when the operation clock of each processor unit is in a normal state (the clock frequency is in a state of (fn)) (hereinafter referred to as "estimated power demand B") to calculate a variation power (hereinafter referred to as "variation power B"). The estimated power demand B is a value which is measured in advance, and stored beforehand in the ROM 140. Before entering the suspend mode, the total power demand of all the processor units may be measured to use this power demand as the estimated power demand B (step 815).

Thereafter, the power demand monitoring unit 301 judges whether the calculated variation power B is larger than the estimated variation power (hereinafter referred to as "estimated variation power B") (step 816). The estimated variation power B is set to a value which has no effect on the system, and it may be equal to the same value as the previous estimated variation power A. If the variation power B is larger than the estimated variation power B, the power demand monitoring unit 301 outputs a first start instruction to the operation clock controller 210. In response to the first start instruction, the operation clock controller 210 successively starts the supply of the operation clock to each processor unit (step 817, step 818, step 819). Like the above case, when plural processor units are allocated to each group, the clocks are simultaneously supplied to the respective processor units in each group, and this operation is successively performed for all the groups. This operation can suppress the spike noise occurring in the power source or the ground portion even when the mode is shifted from the suspend mode to the normal operation mode, and thus malfunctions of the system and the occurrence of radiation noise can be suppressed.

On the other hand, in step 816, if the calculated variation power B is smaller than the predetermined estimated variation power B, the power demand monitoring unit 301 outputs a second start instruction to the operation clock controller 210. In response to the second start instruction, the operation clock controller 210 simultaneously supplies the clocks to all the processor units over all the groups (step 821). With this operation, the processing time can be shortened like the above case.

Subsequently, permission to use the processor bus 122 is released when the supply of the operation clocks to all the processor units has been completed (step 820).

In order to reduce the power demand of the system, the processing of stopping the operation clock of each processor unit is performed as described with reference to FIGS. 2 and 3. However, the same effect can be obtained when the frequency of the operation clock is set to a smaller value than at the normal operation time.

Figure 5:
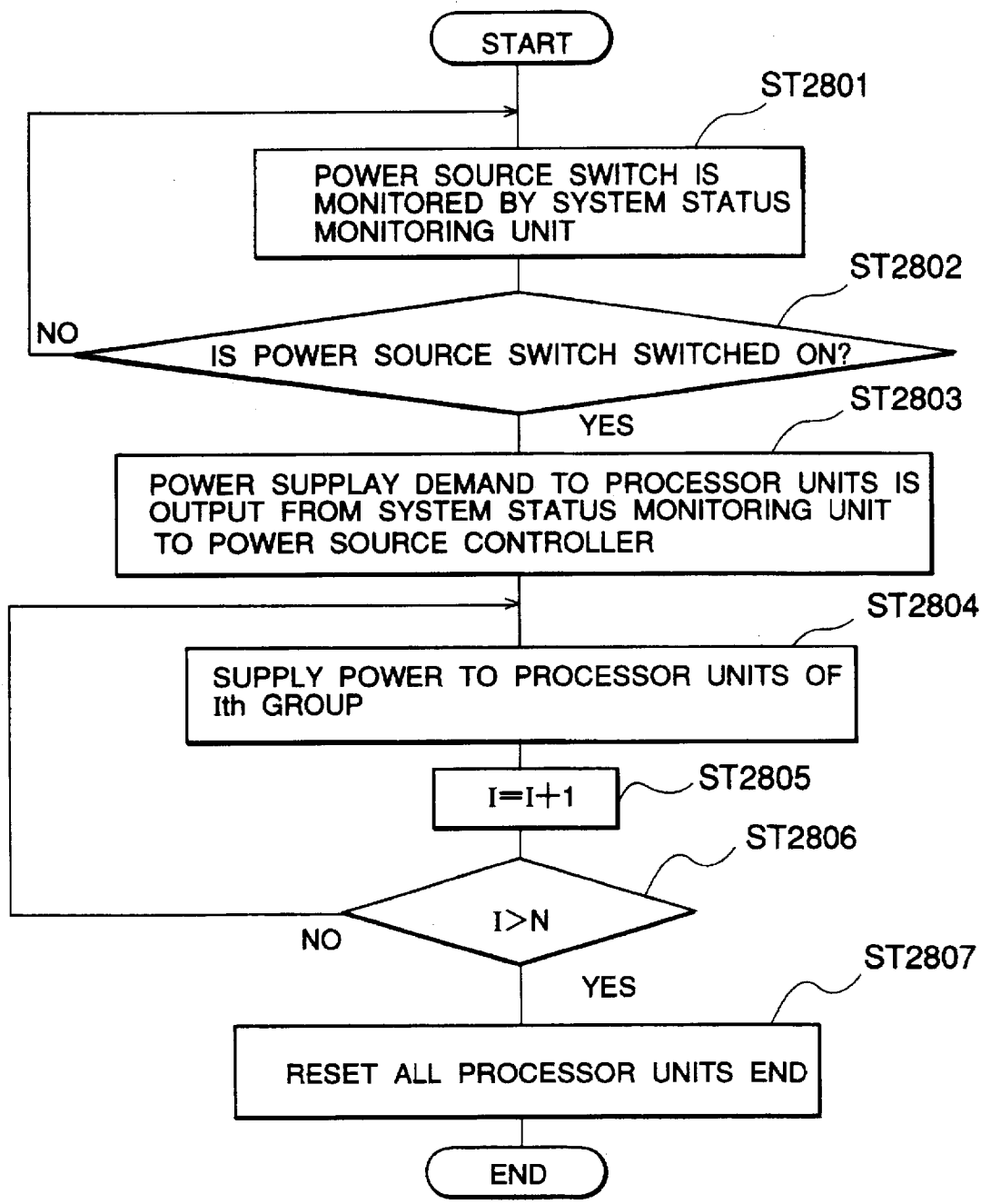
FIG. 5 is a flowchart for processing of turning on a power source in the second embodiment of the present invention.
Figure 6:
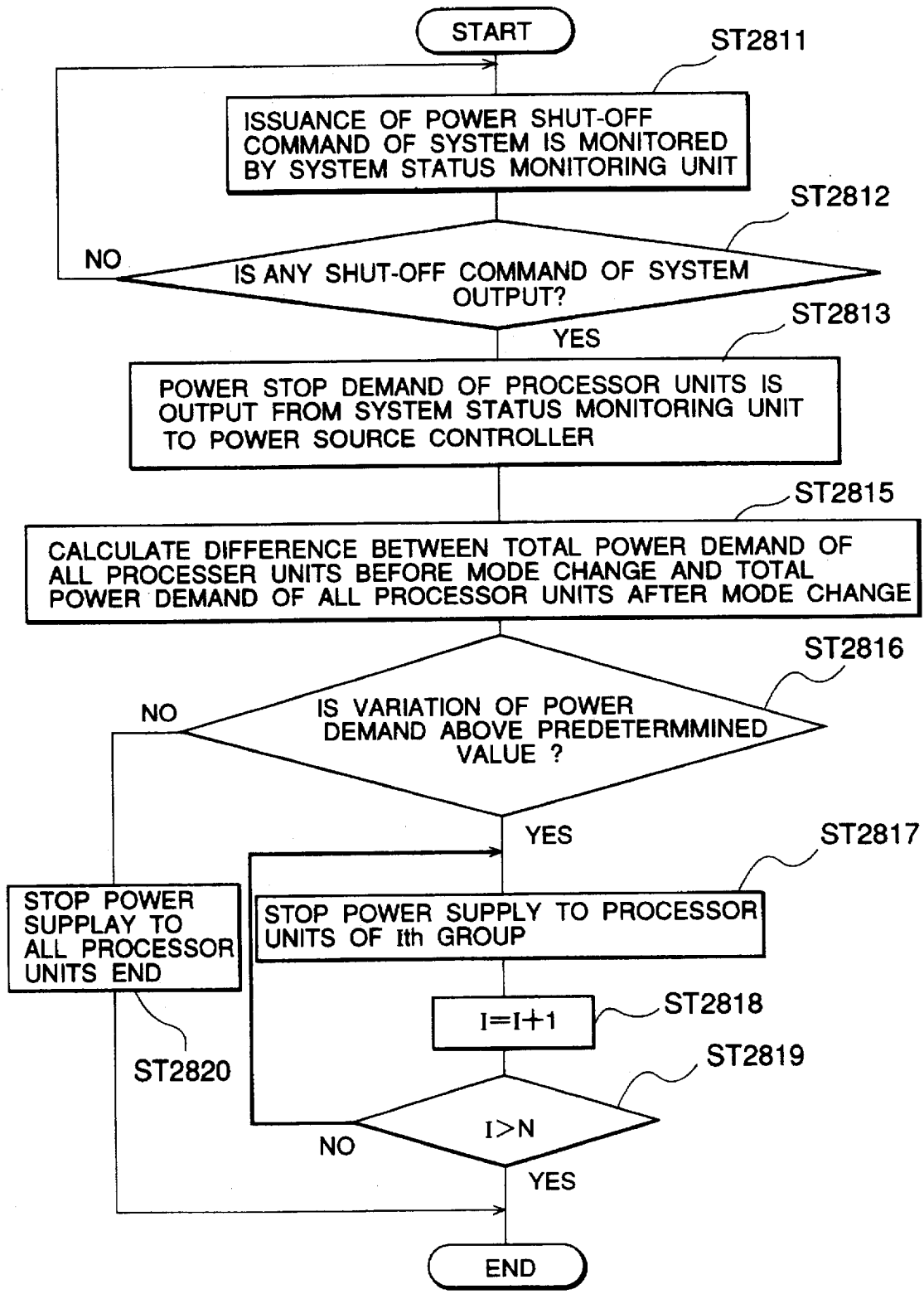
FIG. 6 is a flowchart for shutting off a power source in the second embodiment.

Next, a second embodiment according to the present invention will be described with reference to FIGS. 4 to 6. In this embodiment, the power variation which occurs when the power is supplied to the system or the power supply is shut off is reduced by displacing the timing of the power supply/stop between the respective processor units.

Figure 4:
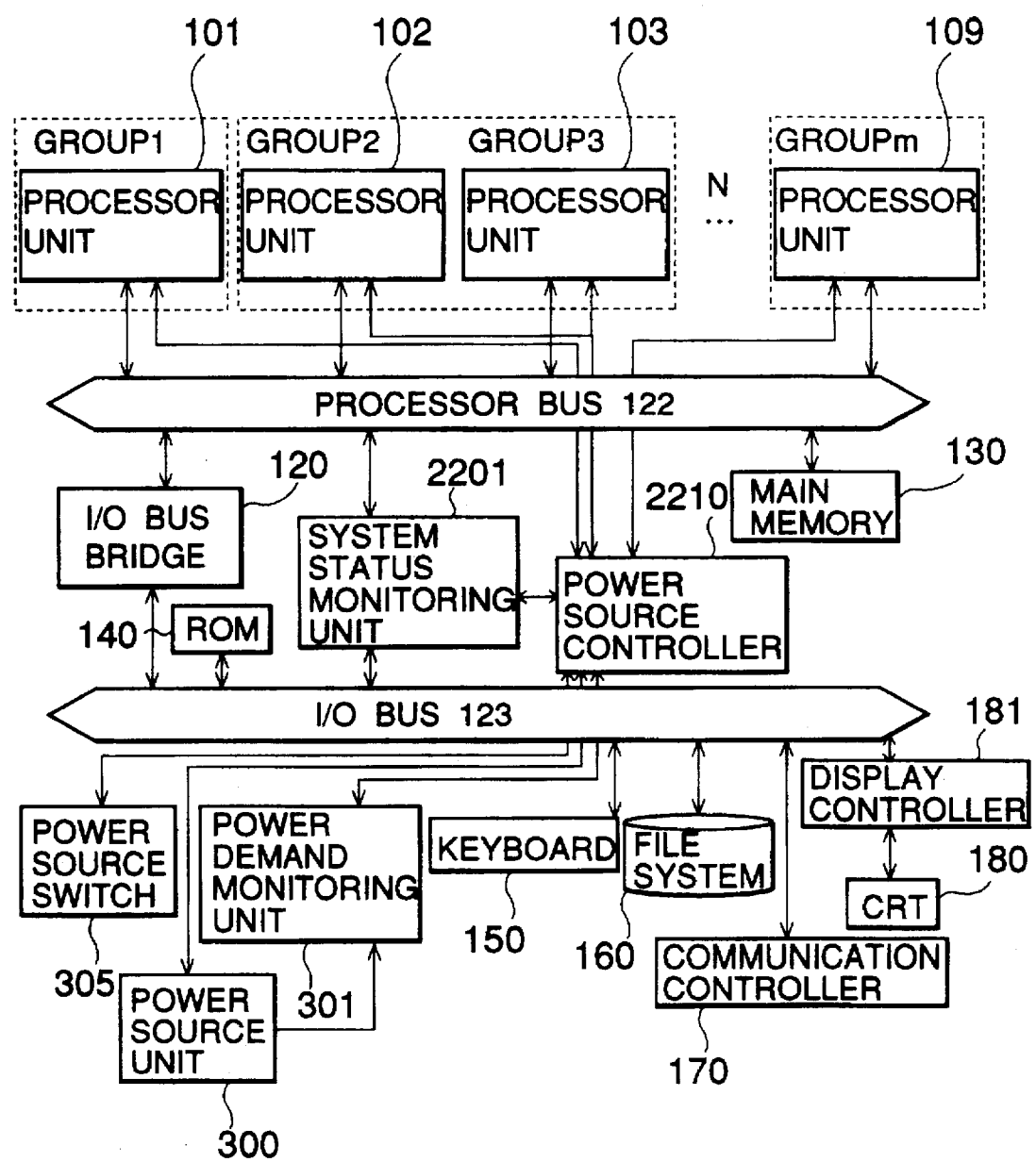
FIG. 4 is a block diagram showing a second embodiment of the multiprocessor according to the present invention.

FIG. 4 shows a power source controller 2210 which is connected to a power source unit 300 and a power demand monitoring unit 301, a power source switch for performing a switch on/off operation of the power source, and a system status monitoring unit 2201. In this embodiment, one processor unit is allocated to each group. In FIG. 4, the same elements as the first embodiment are represented by the same reference numerals, and the description thereof is omitted.

Next, an operation when power is supplied to the system will be described with reference to FIGS. 4 and 5.

The system status monitoring unit 2201 monitors the power source switch 3305 (step 2801) to detect whether the power source switch 305 is switched on (step 802). If it is detected that the power source switch 305 is in an ON-state, the system status monitoring unit 2201 outputs a power supply instruction to the power source controller 2210. In response to the power supply instruction, the power source controller 2210 successively supplies power to each processor unit (step 2804, step 2805, step 2806). When the power supply to all the processor units is completed, all the processor units are reset and initialized (step 2807). When plural processor units are allocated to each group, the processor units of each group are collectively supplied with power, and this power supply operation is successively performed over all the groups. By performing the stepwise power supply operation on the processor units as described above, the power variation when the power is supplied can be reduced.

Next, an operation when the power to the system is shut off will be described with reference to FIGS. 4 and 6. In this embodiment, the power shut-off operation is performed by a program (so-called "shut down program") which is executed in the processor unit. It is needless to say that the power shut-off operation can be performed by switching off the power source switch.

The system status monitoring unit 2201 monitors, at all times, a power shut-off command which is output on the basis of the program, and detects whether the power shut-off instruction is output (step 2812). When the power shut-off instruction is output, the measuring instruction is output to the power demand monitoring unit 301. In response to the measuring instruction, the power demand monitoring unit 301 measures the total power demand of all the processor units at this time. Subsequently, the power demand monitoring unit 301 judges whether the measured power demand (hereinafter referred to as "power demand C") is larger than a predetermined variation power (hereinafter referred to as "estimated variation power C") (step 2815). Since the total power demand of all the processor units when the power supply to each processor unit is stopped is equal to zero, the power demand C is directly equal to the variation power C. The estimated variation power C is stored in the ROM 140 in advance.

The power demand monitoring unit 301 judges whether the variation power C is larger than the estimated variation power C (step 2816), and if the variation power C is larger than the estimated variation power C, the power demand monitoring unit 301 outputs a first shut-off instruction to the power source controller 2210. In response to the first shut-off instruction, the power source controller 2210 successively stops the power supplied to each processor unit(step 2817, step 2818, step 2819). As described above, the power variation can be suppressed by successively stopping the power supply to each of the N processor units. When plural processor units are allocated to each group, the power supply to the respective processor units of each group is collectively (simultaneously) stopped, and this collective (simultaneous) stopping operation is performed over all the groups in turn.

On the other hand, if it is judged in step 2816 that the calculated variation power C is smaller than the predetermined estimated variation power C, the power demand monitoring unit 301 outputs a second shut-off instruction to the power source controller 2210. In response to the second shut-off instruction, the power source controller 2210 collectively (simultaneously) stops the power supply to all the processor units irrespective of the groups (step 2820).

As described above, according to the present invention, the power variation occurring at the time of power supply or at the time of power shut-off can be reduced, so that the spike noise occurring in the power source and the ground portion can be prevented. Since the spike noise can be suppressed, a filter (specifically, a capacitor) to be inserted in the power source portion can be reduced in capacitance.

The present invention is not limited to the first and second embodiments as described above, and it may be applied to a widely used large-size computer having a multiprocessor system. In the first and second embodiments, the processor units are grouped. The grouping may be performed for every print wiring board. With this group arrangement, it is sufficient to provide only one interface portion with the power source controller 2210 of FIG. 4. Accordingly, the mounting area of the printed wiring board can be reduced, and also the control circuit can be simplified.

In the first embodiment, the switching operation between the normal operation mode and the suspend mode is performed in accordance with the key input status of the keyboard 150. The switching operation may be performed in accordance with an overall load status of all the processor units. In the following embodiment, the mode switching function in accordance with the load status will be hereunder described.

Figure 7:
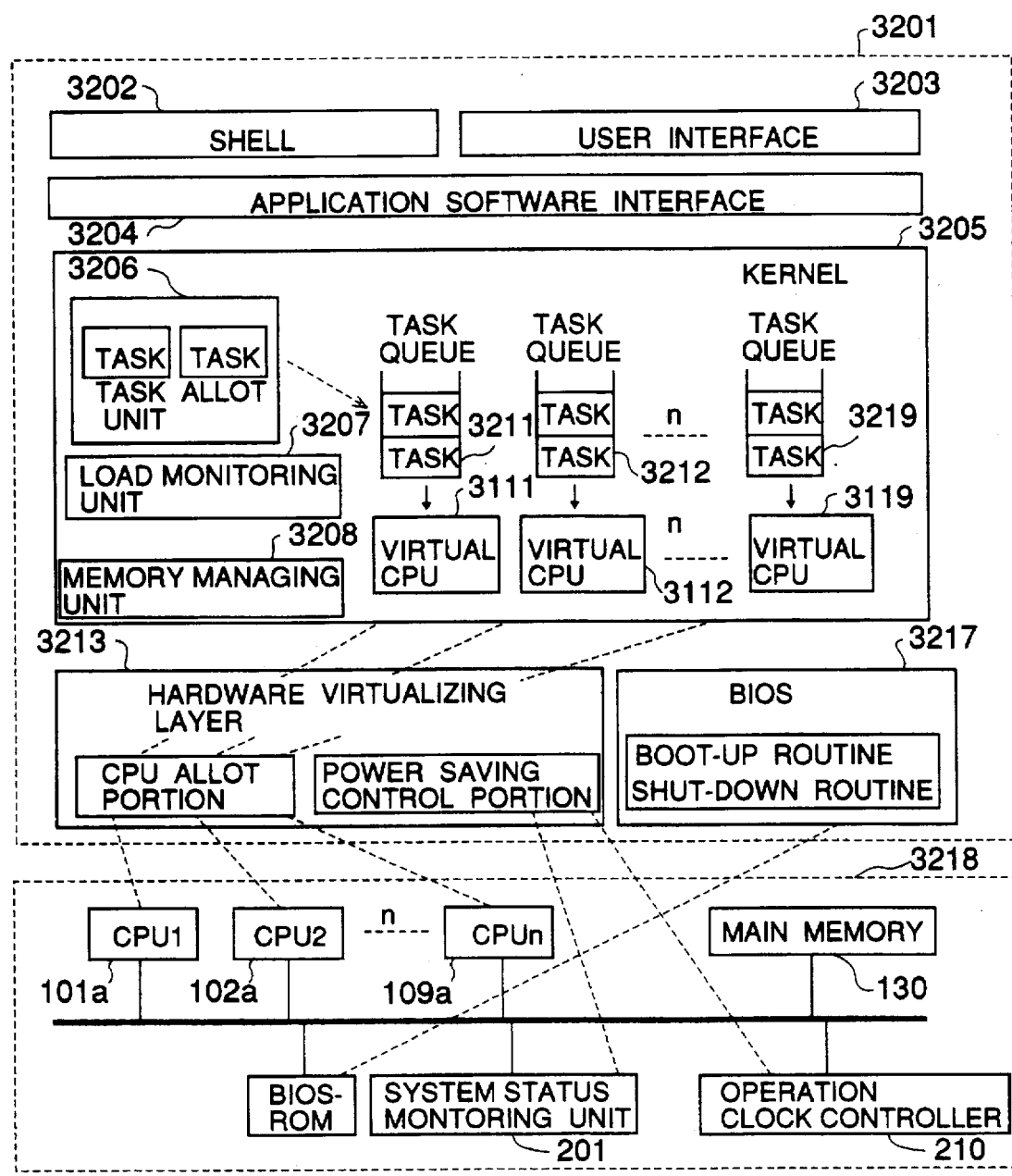
FIG. 7 is a software construction of a third embodiment.

FIG. 7 shows the software construction of the third embodiment according to the present invention. In this embodiment, the same hardware as shown in FIG. 1 is usable.

In FIG. 7, an operating system (hereinafter referred to as "OS") which is conformable to the multiprocessor system works on N CPUs (CPUs 101a, 102a, . . . , 109a). The OS 3201 comprises a kernel 3205, an application software interface 3204 for performing an input/output operation of application software, a user interface 3203 for performing an input/output operation with a user, a shell 3202, a BIOS (Basic Input/Output System) 3217 having a shut-down routine, and a hardware virtualizing layer 3213 for virtualizing hardware of the multiprocessor system 3218 for the kernel 3205.

The kernel 3205 serves to manage n virtual CPUs (virtual CPUs 3111, 3112, . . . , 3119) which are resources of the OS, and it has n task queues (task cues 3211, 3212, . . . , 3119) which are a task queue for each virtual CPU, a task allot unit 3206 for allotting a task to each task queue, a load monitoring unit 3207, and a memory managing unit 3208.

The load monitoring unit 3207 monitors a jam status of each task and an operation frequency of the task allot unit 3206 to recognize the load status of the system. When the load of the system is reduced to a value which is smaller than a predetermined value, the load monitoring unit 3207 starts a time counting operation. When the counted time exceeds a predetermined time, the load monitoring unit 3207 outputs an instruction to shift the mode to the suspend mode. Further, when the load of the system is larger than a predetermined value in the suspend mode, the system is operated so that the mode is returned from the suspend mode to the normal mode.

What is claimed is:

1. A multiprocessor system having plural processor units including:

a reception circuit for receiving a setting demand requesting one of a first mode in which each of said plural processor units is in a normal state and a second mode in which each of said plural processor units is in a low power-demand state whose consumed power is smaller than that of the normal state; and a setting circuit for classifying said plural processor units into plural groups, each group containing at least one processor unit, to successively set said plural groups to the normal state in turn when said reception circuit receives a setting demand requesting the first mode, and to successively set said plural processor units to the low power-demand state in turn when said reception circuit receives a setting demand requesting the second mode, wherein said setting circuit measures the total power demand of said plural processor units when said reception circuit receives the setting demand requesting one of the first mode or the second mode, calculates the difference between the measured total power demand and a total power demand of said plural processor units in the requested mode, and collectively sets the plural processor units to the normal state or the low power-demand state in accordance with the requested mode when the calculated difference is smaller than a predetermined value.

2. The multiprocessor system as claimed in claim 1, wherein said setting circuit changes the operation frequency of said processor units to perform a setting operation of said processor units to one of the normal state and the low power-demand state.

3. The multiprocessor system as claimed in claim 2, further including an input circuit for monitoring an external operation, and a circuit for outputting the setting demand requesting the second mode to the reception circuit when the multiprocessor system is set in the first mode and the external operation monitored by said input circuit does not occur for a predetermined time and outputting the setting demand requesting the first mode to said reception circuit when the multiprocessor system is set in the second mode and the external operation monitored by said input circuit occurs.

4. The multiprocessor system as claimed in claim 2, further including a detection circuit for detecting the magnitude of the total load of respective processing steps of said plural processor units, and a circuit for outputting the setting demand requesting the second mode to said reception circuit when the first mode is set and when the magnitude of the total load detected by said detection circuit is smaller than the magnitude of a predetermined total load and this state is continued for a predetermined time, and outputting the setting demand requesting the first mode to said reception circuit when the second mode is set and when the magnitude of the total load detected by said detection circuit is larger than the magnitude of the predetermined total load.

5. The multiprocessor system as claimed in claim 1, wherein said setting circuit changes the magnitude of a voltage to be supplied to said processor units to perform the setting operation of said processor units to one of the normal state and the low power-demand state.

6. The multiprocessor system as claimed in claim 5, further including an input circuit for monitoring an external operation, and a circuit for outputting the setting demand requesting the second mode to the reception circuit when the multiprocessor system is set in the first mode and the external operation monitored by said input circuit does not occur for a predetermined time and outputting the setting demand requesting the first mode to said reception circuit when the multiprocessor system is set in the second mode and the external operation monitored by said input circuit occurs.

7. The multiprocessor system as claimed in claim 5, further including a detection circuit for detecting the magnitude of the total load of respective processing steps of said plural processor units, and a circuit for outputting the setting demand requesting the second mode to said reception circuit when the first mode is set and when the magnitude of the total load detected by said detection circuit is smaller than the magnitude of a predetermined total load and this state is continued for a predetermined time, and outputting the setting demand requesting the first mode to said reception circuit when the second mode is set and when the magnitude of the total load detected by said detection circuit is larger than the magnitude of the predetermined total load.

8. The multiprocessor system as claimed in claim 1, further including an input circuit for monitoring an external operation, and a circuit for outputting the setting demand requesting the second mode to the reception circuit when the multiprocessor system is set in the first mode and the external operation monitored by said input circuit does not occur for a predetermined time and outputting the setting demand requesting the first mode to said reception circuit when the multiprocessor system is set in the second mode and the external operation monitored by said input circuit occurs.

9. The multiprocessor system as claimed in claim 1, further including a detection circuit for detecting the magnitude of the total load of respective processing steps of said plural processor units, and a circuit for outputting the setting demand requesting the second mode to said reception circuit when the first mode is set and when the magnitude of the total load detected by said detection circuit is smaller than the magnitude of a predetermined total load and this state is continued for a predetermined time, and outputting the setting demand requesting the first mode to said reception circuit when the second mode is set and when the magnitude of the total load detected by said detection circuit is larger than the magnitude of the predetermined total load.

10. A multiprocessor system having plural processor units including:

a reception circuit for receiving a setting demand requesting one of a first mode in which each of said plural processor units is in a normal state and a second mode in which each of said plural processor units is in a low power-demand state whose consumed power is smaller than that of the normal state; and a setting circuit for classifying said plural processor units into plural groups, each group containing at least one processor unit, to successively set said plural groups to the normal state in turn when said reception circuit receives a setting demand requesting the first mode, and to successively set said plural processor units to the low power-demand state in turn when said reception circuit receives a setting demand requesting the second mode, wherein said setting circuit changes the operation frequency of said processor units to perform a setting operation of said processor units to one of the normal state and the low power-demand state.

11. The multiprocessor system as claimed in claim 10, further including an input circuit for monitoring an external operation, and a circuit for outputting the setting demand requesting the second mode to the reception circuit when the microprocessor system is set in the first mode and the external operation monitored by said input circuit does not occur for a predetermined time and outputting the setting demand requesting the first mode to said reception circuit when the multiprocessor system is set in the second mode and the external operation monitored by said input circuit occurs.

12. The multiprocessor system as claimed in claim 10, further including a detection circuit for detecting the magnitude of the total load of respective processing steps of said plural processor units, and a circuit for outputting the setting demand requesting the second mode to said reception circuit when the first mode is set and when the magnitude of the total load detected by said detection circuit is smaller than the magnitude of a predetermined total load and this state is continued for a predetermined time, and outputting the setting demand requesting the first mode to said reception circuit when the second mode is set and when the magnitude of the total load detected by said detection circuit is larger than the magnitude of the predetermined total load.

13. A multiprocessor system having plural processor units including:

a reception circuit for receiving a setting demand requesting one of a first mode in which each of said plural processor units is in a normal state and a second mode in which each of said plural processor units is in a low power-demand state whose consumed power is smaller than that of the normal state; and a setting circuit for classifying said plural processor units into plural groups, each group containing at least one processor unit, to successively set said plural groups to the normal state in turn when said reception circuit receives a setting demand requesting the first mode, and to successively set said plural processor units to the low power-demand state in turn when said reception circuit receives a setting demand requesting the second mode, wherein said setting circuit changes the magnitude of a voltage to be supplied to said processor units to perform the setting operation of said processor units to one of the normal state and the low power-demand state.

14. The multiprocessor system as claimed in claim 13, further including an input circuit for monitoring an external operation, and a circuit for outputting the setting demand requesting the second mode to the reception circuit when the multiprocessor system is set in the first mode and the external operation monitored by said input circuit does not occur for a predetermined time and outputting the setting demand requesting the first mode to said reception circuit when the multiprocessor system is set in the second mode and the external operation monitored by said input circuit occurs.

15. The multiprocessor system as claimed in claim 13, further including a detection circuit for detecting the magnitude of the total load of respective processing steps of said plural processor units, and a circuit for outputting the setting demand requesting the second mode to said reception circuit when the first mode is set and when the magnitude of the total load detected by said detection circuit is smaller than the magnitude of a predetermined total load and this state is continued for a predetermined time, and outputting the setting demand requesting the first mode to said reception circuit when the second mode is set and when the magnitude of the total load detected by said detection circuit is larger than the magnitude of the predetermined total load.

16. A multiprocessor system having plural processor units, including:
- a reception circuit for receiving a setting demand requesting one of a first mode in which each of said plural processor units is in a normal state and a second mode in which each of said plural processor units is in a low power-demand state whose consumed power is smaller than that of the normal state,
- a setting circuit for classifying said plural processor units into plural groups, each group containing at least one processor unit, to successively set said plural groups to the normal state in turn when said reception circuit receives a setting demand requesting the first mode, and to successively set said plural processor units to the low power-demand state in turn when said reception circuit receives a setting demand requesting the second mode,
- an input circuit for monitoring an external operation, and
- a circuit for outputting the setting demand requesting the second mode to the reception circuit when the multiprocessor system is set in the first mode and the external operation monitored by said input circuit does not occur for a predetermined time and outputting the setting demand requesting the first mode to said reception circuit when the multiprocessor system is set in the second mode and the external operation monitored by said input circuit occurs.

17. A multiprocessor system having plural processor units, including:
- a reception circuit for receiving a setting demand requesting one of a first mode in which each of said plural processor units is in a normal state and a second mode in which each of said plural processor units is in a low power-demand state whose consumed power is smaller than that of the normal state,
- a setting circuit for classifying said plural processor units into plural groups, each group containing at least one processor unit, to successively set said plural groups to the normal state in turn when said reception circuit receives a setting demand requesting the first mode, and to successively set said plural processor units to the low power-demand state in turn when said reception circuit receives a setting demand requesting the second mode,
- a detection circuit for detecting the magnitude of the total load of processing steps of said plural processor units, respectively, and
- a circuit for outputting the setting demand requesting the second mode to said reception circuit when the first mode is set and when the magnitude of the total load detected by said detection circuit is smaller than the magnitude of a predetermined total load and this state is continued for a predetermined time, and outputting the setting demand requesting the first mode to said reception circuit when the second mode is set and when the magnitude of the total load detected by said detection circuit is larger than the magnitude of the predetermined total load.

18. A multiprocessor system having plural processor units, including:
- a reception circuit for receiving a setting demand requesting one of a first mode in which each of said plural processor units is in a normal state and a second mode in which each of said plural processor units is in a low power-demand state whose consumed power is smaller than that of the normal state, and
- a setting circuit for classifying said plural processor units into plural groups, each group containing at least one processor unit, to successively set said plural groups to the normal state in turn when said reception circuit receives a setting demand requesting the first mode, and to successively set said plural processor units to the low power-demand state in turn when said reception circuit receives a setting demand requesting the second mode,
- wherein said plural processor units are grouped on respective print wiring boards to be mounted.

19. A multiprocessor system having plural processors which are classified into plural groups in advance, each one of the groups containing at least one processor, said multiprocessor system including:
- a generation circuit generating a setting demand requesting one of first mode in which each of said plural groups is in a normal state and a second mode in which each of said plural groups is in a low power-demand state whose consumed power is smaller than the first mode;
- a reception circuit receiving said setting demand; and
- a setting circuit successively setting each of said plural groups to said normal state in turn according to said setting demand requesting said first mode being received by said reception circuit, and successively setting each of said plural groups to said low power-demand state according to said setting demand requesting said second mode being received by said reception circuit.

20. The multiprocessor system as claimed in claim 19, further including an input circuit inputting a signal corresponding to an instruction received from outside said multiprocessor system and an output circuit outputting said setting demand requesting said second mode when said input circuit does not input said signal during a predetermined time while each of said plural groups are set to be in said first mode, and outputting said setting demand requesting said first mode when said input circuit inputs said signal while each of said plural groups are set to be in said second mode.

* * * * *